United States Patent [19]
Sikich

[11] 3,979,193
[45] Sept. 7, 1976

[54] CORONA DISCHARGE APPARATUS

[76] Inventor: Jack Sikich, 105 S. Orchard, Waukegan, Ill. 60085

[22] Filed: Nov. 29, 1974

[21] Appl. No.: 528,407

Related U.S. Application Data

[63] Continuation of Ser. No. 268,834, July 3, 1972, abandoned, which is a continuation of Ser. No. 105,013, Jan. 8, 1971, abandoned.

[52] U.S. Cl. .................... 55/123; 23/277 C; 55/146; 55/152; 55/DIG. 30; 60/275; 60/282; 204/176
[51] Int. Cl.² .................................. B03C 3/04
[58] Field of Search .............. 55/DIG. 30, 2, 152, 55/123, 146; 60/273, 274, 275, 282; 23/277 C; 204/164, 173, 174, 176, 177–179; 313/351, 309, 140, 139, 138

[56] References Cited
UNITED STATES PATENTS

| | | | |
|---|---|---|---|
| 1,298,889 | 4/1919 | Chance | 204/164 |
| 2,195,431 | 4/1940 | Shively et al. | 313/351 |
| 3,188,167 | 6/1965 | Specht | 60/275 |

FOREIGN PATENTS OR APPLICATIONS

| | | | |
|---|---|---|---|
| 858,692 | 12/1952 | Germany | 55/152 |

Primary Examiner—Bernard Nozick
Attorney, Agent, or Firm—Roy E. Petherbridge; Robert L. Lindgren; Edward D. Gilhooly

[57] ABSTRACT

A apparatus for controlling the amount of polluting substances within a fluid such as the exhaust gas of an internal combustion engine, wherein the polluted fluid passes through a corona-producing chamber having spaced conductive members biased by an alternating electrical potential which effect elimination or conversion of the harmful substances within the exhaust through a series of chemical reactions. Prior to passing through the corona-producing chamber, the exhaust gas is mixed with air or other oxygen containing substance to create an ozone field and other chemical reactants within the chamber to reduce the amount of various contaminants of the polluted gas. The corona-producing member is provided with a plurality of corona-emitting elements which cause an intense corona discharge to occur within the chamber.

7 Claims, 5 Drawing Figures

U.S. Patent  Sept. 7, 1976  3,979,193
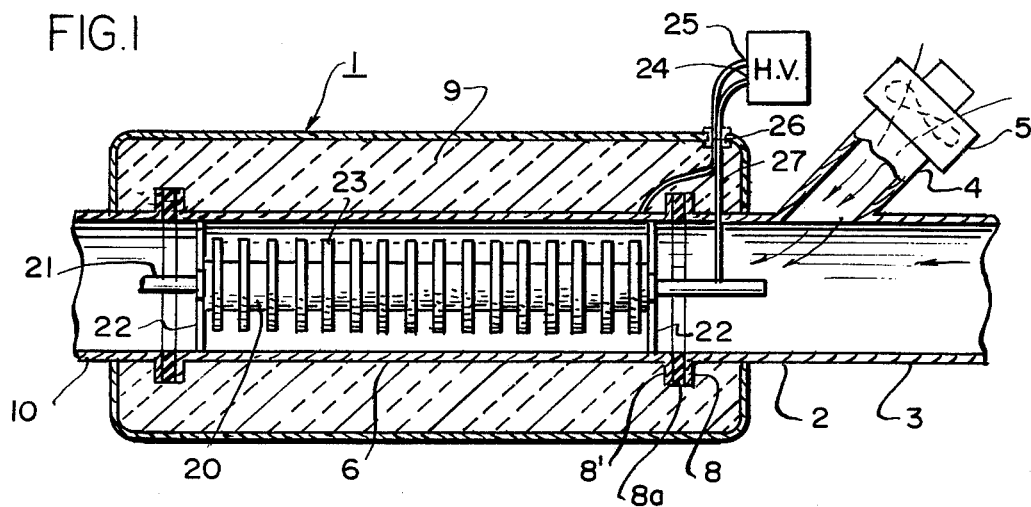
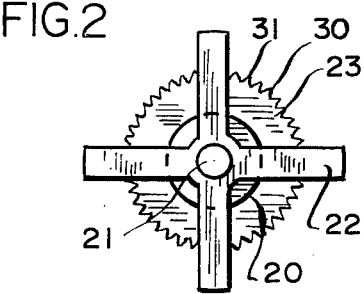 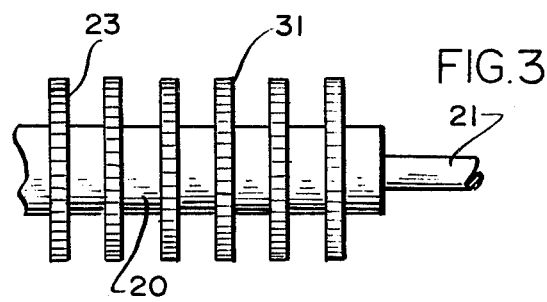
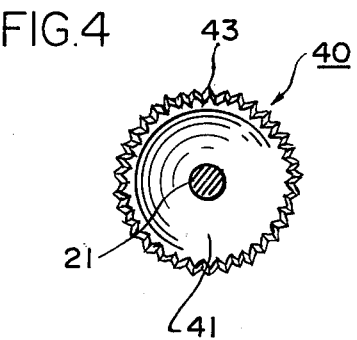 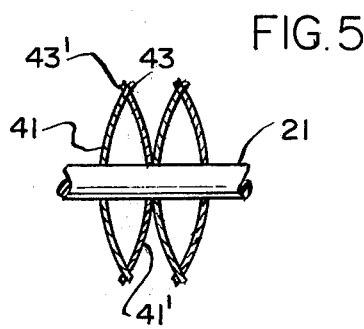
INVENTOR.
JACK SIKICH
BY Petherbridge, O'Neill &
Lindgren
ATTORNEYS.

CORONA DISCHARGE APPARATUS

This is a continuation of application Ser. No. 268,834 filed July 3, 1972 which is, in turn, a continuation of application Ser. No. 105,013 filed Jan. 8, 1971 both abandoned.

BACKGROUND OF THE INVENTION

This invention relates to a method and apparatus for controlling pollution and, in particular, to a novel method and apparatus which eliminates pollutants from a fluid through chemical effects created by a corona discharge.

More specifically, the invention relates to a pollution control method and apparatus adapted to remove pollutants from a fluid such as created in the exhaust gas of an internal combustion engine and the like whereby the polluted material is mixed with an oxygen containing fluid and is directed through a novel pollution elimination chamber. The pollution elimination chamber includes a corona-emitting member having a plurality of elements which produce an intense corona field to reduce pollution therein. In one embodiment of the invention, the corona-emitting member includes a plurality of discs having an outer peripheral surface which significantly intensifies the production of corona within the pollution-elimination chamber.

As is well known, the existence of a multitude of exhaust-producing agents such as automobiles, trucks, incinerators and the like has created threatening problems with respect to contamination and pollution of out environment. A significant amount of pollution of the atmosphere is derived from the existance of great numbers of internal combustion engines which are operated without any efficient control of the exhaust gases being emitted therefrom. Although not intended to be so limited, for convenience of illustration, the pollution control apparatus of this invention is described for use in the control of the exhaust gases of such internal combustion power plants.

Generally, the exhaust from an internal combustion engine such as that used in an automobile includes certain pollutants such as carbon monoxide, hydro carbons, carbon particulates, lead substances, sulfur and numerous other combustion products. In the prior art, countless techniques have been attempted to control and eliminate the harmful effects of exhaust gases and other polluted fluids. Previous devices have involved various mechanical, electronic and chemical processes in order to accomplish the desired elimination of pollution.

Although a great deal of research and development has gone into the field of pollution control, none of the prior art techniques has achieved the desired degree of efficiency and reliability to overcome the serious pollution problem. Previous attempts of relying on electronics to remove or convert undesired substances from an exhaust gas have presented several difficulties in achieving satisfactory results. For example, some of these devices have operated in a successful manner to remove one contaminant from the exhaust gas but which at the same time fail to remove other detrimental products. In order to accomplish the satisfactory removal of most of the contaminants, these electronic devices have required relatively complex equipment which are not only expensive but could not be depended on to produce satisfactory results over extended periods of time.

The prior methods of utilizing chemical properties such as catalysts and the like to remove pollution also present numerous problems. For example, the chemical reactants used to remove undesired products are consumables and must be uneconomically and inconveniently replaced at regular intervals. Moreover, it has been found that catalysts are greatly dependent on the degree of pollution in the exhaust in order to achieve optimum results and if an automobile is not properly tuned in performance, poor pollution control is accomplished. Chemical pollution control therefore involves expensive techniques which are not altogether satisfactory in practice.

Another mode of pollution control has been attempted which relies on a spark gap or corona to create ozone within an exhaust gas. Although some carbon monoxide is converted to carbon dioxide in these systems, the intensity of the ozone field has not been of the degree necessary for optimum removal of carbon monoxide. Moreover, such prior apparatus has failed to remove many of the other harmful contaminants present in an exhaust gas. The use of corona emission in such known devices also effects ionic charging of particles such as carbon in the exhaust to cause adherence of the particles to the corona producing elements before the material can be effectively destroyed. Such adherence of particles to the corona producing elements also reduces the effectiveness of the corona field as well as requires frequent cleaning of the elements.

The afore-mentioned mechanical pollution control techniques appear to have little or no effect in eliminating the dangerous and harmful components which are emitted from an internal combustion engine. Therefore, it is desirable to provide a pollution control method and apparatus which efficiently removes a great proportion of the contaminants of an exhaust gas in a manner which is both reliable in operation and economical in cost and maintenance.

SUMMARY OF THE INVENTION

It is therefore an object of this invention to improve the removal of pollution from exhaust and waste fluids.

Another object of this invention is to eliminate a majority of the pollutants within an exhaust fluid in a simplified and economical manner.

A further object of this invention is to control and eliminate pollution by subjecting the exhaust fluid to an intense corona-producing chamber.

Still another object of this invention is to effectively increase the intensity of corona formed in a pollution removal chamber.

A still further object of this invention is to increase the control of pollution by subjecting the exhaust material to corona-producing elements coupled to an alternating electrical potential.

These and other objects are attained in accordance with the present invention wherein there is provided a pollution control apparatus which subjects the contaminated material to an extensive corona field. The exhaust gas is mixed with an oxygen-containing gas such as atmospheric air and the mixture subsequently passes through the novel corona-producing chamber of the invention. Corona emission is produced within the chamber by applying an electrical potential across two spaced conductive members to cause ionization of the gas and thus a glow discharge. The corona produced within the pollution removal chamber creates a plasma-like field which operates to effect a multitude of various chemical reactions on the gas passing through the apparatus. For example, the creation of corona creates an ozone field within the entire chamber which acts to convert harmful carbon monoxide into carbon dioxide. Moreover, the pollution elimination chamber of the apparatus effectively oxidizes carbon, carbon particulates, and sulphur; converts lead material into a relatively safe ash, burns away smoke, oil, and the like; and produces other pollution control operations.

The corona-producing members of the pollution control chamber include a plurality of elements having numerous corona emitting points which create an intense corona field within the entire volume of the chamber. Such members in the pollution elimination chamber are coupled to the opposite terminals of an alternating electrical potential. The alternating polarity of the corona producing elements prevents precipitation of charged particulates and adherence thereof to the structure of the chamber and also maintains any ionized substances moving and reactive. Thus particulates such as carbon and ash resulting from combustion are forced to pass through the entire elongated corona field to result in their substantial destruction. Such a result is not possible in prior D-C type corona devices in which the particles tend to adhere to the emitter before complete conversion. The invention allows particles such as carbon and the like to pass through the elongated pollution elimination chamber without being attached to the corona elements and thus the particles are subjected to the corona produced plasma for a length of time sufficient to completely oxidize, combust or convert the material.

Also, the reliance on a corona induced by an A.C. voltage not only creates a more intense corona than possible with a direct current voltage but also alleviates the necessity of periodically cleaning the pollution chamber and its associated elements. The present invention provides a pollution control apparatus which economically reliably converts the various contaminants of an exhaust gas and the like to a relatively safe form in an effective manner.

DESCRIPTION OF THE DRAWING

Further objects of the invention together with additional features contributing thereto and advantages accruing therefrom will be apparent from the following description of several embodiments of the invention when read in conjunction with the accompanying drawing wherein:

FIG. 1 is a schematic illustration of a pollution control apparatus of the invention;

FIG. 2 is a schematic end illustration of one embodiment of the corona-emitting member and support for use in the pollution control apparatus of FIG. 1;

FIG. 3 is a schematic side illustration of the corona-emitting member of FIG. 2;

FIG. 4 is a schematic end illustration of another embodiment of the corona-emitting member for use in the pollution control apparatus of FIG. 1;

FIG. 5 is a schematic side illustration of the corona-emitting member of FIG. 4;

DESCRIPTION OF THE PREFERRED EMBODIMENTS

Referring to FIG. 1, there is shown a schematic view of a pollution control apparatus 1 for eliminating pollution of an exhaust gas according to the present invention. The exhaust fluid is introduced into the apparatus through an inlet fitting 2 which is adapted to be coupled to an exhaust gas producing source such as the exhaust manifold of an internal combustion engine (not shown). The inlet fitting is conveniently formed in the shape of a tubular Y connector made of a suitable heat resistant material such as, for example, iron and the like. A first leg 3 of inlet fitting 2 is coupled to the exhaust line by any conventional pipe coupling technique such as interengaging threads to insure the introduction of the exhaust without leakage. The connection may be made at any point downstream the exhaust emission of the engine prior to or after the exhaust passes through the muffler of the vehicle.

The second leg 4 of the inlet fitting is attached to a source of oxygen-containing gas such as air to effect a mixing of the air with the exhaust gas to provide a proper amount of oxygen within the exhaust. In FIG. 1, there is shown a conventional air fan 5 which creates a flow of air into the system, although it is within the scope of the invention to utilize other means to introduce air into the system such as by air scoops mounted on the vehicle to create a ram effect, flow created by the fan of the vehicle, and other suitable sources. If the pollution control apparatus of the invention is utilized upon a vehicle such as an automobile, the air fan may be of a well known variable speed type in which the amount of air introduced into the apparatus is controlled by the power output of the engine to which it is coupled to insure proper pollution control. For example, the variable speed blower can be controllably connected to the accelerator linkage in a well known manner or may be attached to a tachometer sensor. Alternatively, the air may be introduced through a variable opening such as louvers whose degree of opening is dependent on the power output of the engine.

End 2' of the inlet fitting coupled to the upstream end of a tubular conduit 6 forming the pollution elimination chamber 7 to conduct the mixture of air and exhaust formed within the Y connector into the chamber. The inlet fitting is attached to conduit 6 by any suitable technique which provides a fluid-tight connection and further provides thermal and electrical insulation between the two elements. Such a coupling may comprise, as illustrated in FIG. 1, abutting flanges 8 and 8' attached together by any suitable means (not shown) and having an insulative material 8a such as Transite imposed therebetween.

Tubular conduit 6 forms the inner periphery of the pollution elimination chamber 7 and is made of an electrically conductive material to act as a reactor wall for producing a corona emission in the chamber. Although the conduit is described as being tubular, the element may encompass other shapes if desired. A casting 9 of a suitably insulative material such as Transite having both thermally and electrically insulative properties is mounted in surrounding relation to conduit 6 to isolate the element. Preferably, to insure the complete insulation of the pollution elimination chamber, the insulative casting extends for a length greater than the length of conduit 6.

The downstream end of conduit 6 is coupled to an outlet conduit 10 which directs the exhaust gas having passed through the pollution elimination chamber to the muffler, the atmosphere or any other location. The outlet conduit 10 is attached to the conduit 6 in a similar manner as described in reference to the upstream insulative coupling between inlet fitting 3 and the conduit. Thus, it should be apparent that the insulating material at the entrance and the exit of conduit 6 and the surrounding insulative casing 9 thermally and electrically isolates the pollution elimination chamber.

a corona-emitting member 20 is positioned within conduit 6 to effect a corona emission within the chamber. The corona-emitting member includes an elongated rod 21 formed of a suitable conductive material such as aluminum and extends a length longer than conduit 6. As shown in FIGS. 1 and 2, the rod of the corona-producing member may be supported by means of two X-supports 22 constructed with an electrically insulative and heat resistance material and which position the rod at the centerline of conduit 6 along the longitudinal axis thereof.

A plurality of space conductive discs 23 formed on rod 21 or press fitted thereto are positioned along the rod in a parallel relationship to create corona emitting areas. The number of discs utilized is dependent on the desired intensity of corona emission which is selected according to encountered conditions such as the amount of pollution within the exhaust gas, the relative proportion of the component pollutants therein and the like. A corona emission is created within the pollution elimination chamber by electrically coupling rod 21 of the corona-emitting element to one terminal 24 of an externally positioned source H.V. of alternating electrical potential and also electrically coupling conduit 6 to the other terminal 25 of the potential. The biasing of the two spaced conductors creates a corona discharge therebetween due to the small surface area of the periphery of discs 23. The electrical connection between the corona emitter and the potential includes an insulative connector 26 which passes through a suitable opening 27 formed in inlet fitting 2 and casing 9. If the pollution apparatus of the invention is utilized on a vehicle, an alternating potential may derive from the electrical power of the vehicle through the use of suitable well known circuitry methods.

In operation of the pollution control apparatus of FIG. 1, the exhaust gas and oxygen containing air is mixed in the inlet fitting 2 and the mixture passes into the pollution elimination chamber. Upon entering the pollution elimination chamber, the exhaust fluid is subjected to an intense corona field substantially for entire length of conduit 6 as the gas flows therethrough. The existence of oxygen within the exhaust stream and the creation of a corona emission produces a corona-ozone field throughout the chamber to convert carbon monoxide to carbon dioxide. Further, the high intensity corona operates to oxidize substantially all the carbon or carbon particulates existing in the gas, since the corona created by an A.C. potential prevents the adherence of carbon particles or other substances to the reactor wall or corona emitter. Thus, the pollutant materials must traverse the entire length of the chamber or until their complete conversion to carbon dioxide, and water vapor or to another relatively safe form. Such a technique results in effective pollution elimination with no moving parts in the apparatus or any consumable chemicals therein.

Moreover, lead substances emitted by the exhaust gas have found to be completely oxidized in the chamber or at least converted to a harmless ash. Smoke, oil, sulfur and other pollutants are likewise effectively oxidized or reduced to other forms through the inventive technique disclosed herein. Thus, it should be apparent that the complex oxidizing plasma created by the intense corona discharge within the pollution elimination chamber effects a multitude of chemical reactions which pass a relatively safe exhaust to the atmosphere or other location. Although not necessary, a suitable filter F material may be positioned in outlet conduit 10 to remove any combustion products such as ash which were not completely eliminated within the chamber.

Referring now to FIGS. 2 and 3, there is shown an embodiment of the invention which significantly intensifies the corona emission created within pollution elimination chamber of FIG. 1. In the embodiment of FIGS. 2 and 3, the periphery of the discs are formed with a star-like or serrated edge 30 instead of a smooth surface shown in FIG. 1. The points 31 of such a design creates sharp edges which effect a greater and more intense corona emission therefrom. Accordingly, the corona emission member 20 is significantly more effective in causing the desired plasma field within pollution elimination chamber 7.

Referring now to FIGS. 4 and 5, there is illustrated another embodiment of the corona-emitting member 4 for use in the pollution elimination chamber. The member 40 is mounted within conduit 6 in the same manner as the previous embodiments. The corona emitting member 40 of FIGS. 4 and 5 operate on the same principle as that described in reference to the embodiment specifically shown in FIGS. 1, 2, and 3. However, the form of the disc-like members has been modified in the embodiment of FIGS. 4 and 5 to create more surface points for a given length of the chamber to generate a greater intensity of corona within the chamber. Such greater intensity is achieved by forming element 41 in a dish or cup shape which includes periphery 42 having a star-like or serrated configuration to create surface points 43. One dish-like element 41 is placed in contact with an oppositely disposed complementary dish element 41' when positioned on rod 21. The points 43 on the periphery of element 41 are designed to engage and overlap the periphery of other element 41' so that the points 43 and 43' of each interengage in complementary relation and extend beyond the opposite member. It should be apparent, therefore, that the existence of additional surface points for a given length of the corona member as in the embodiment of FIG. 4 increases corona emission for effective control pollution.

In the above description, there has been disclosed an improved apparatus for controlling and removing pollutants from an exhaust gas. For convenience of illustration the pollution control apparatus was described for use in combination with an internal combustion engine but it is within the scope of the invention to utilize the inventive techniques of pollution control to eliminate pollutants from other sources such as diesels, aircraft, industrial smoke stacks, sewer gases, and numerous other applications. Further, the corona emitting elements were described as being a plurality of members mounted on the central support rod but it should be apparent that the emitting elements could also be in the form of convolutions around the rod and the like. In the preferred embodiment, the corona-producing element was disclosed as being coupled to an A.C. voltage, but it is possible to utilize the improved corona generating elements in conjunction with a D.C. potential under certain encountered circumstances.

While the invention has been described with reference to preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. A pollution control apparatus for reducing the amount of pollutants in a fluid discharge comprising:
   a pollution elimination means having an inlet adapted to be attached downstream of a source emitting a fluid discharge, an outlet to release treated fluid discharge, and flow passage therebetween,
   said pollution elimination means including spaced conductive members positioned downstream of the inlet to allow the fluid discharge to pass adjacent thereto,
   a source of alternating electrical potential coupled to the spaced conductive members to create a corona discharge therebetween for effecting chemical reactions to reduce the amount of pollutants in the fluid discharge passing through and the pollutants eliminating means and prevent adherence of material in the fluid discharge to the pollution elimination means,
   said spaced conductive members comprise a first hollow conduit and a second elongated member positioned in spaced relation therein,
   said second elongated member includes a rod extending co-axially with the longitudinal axis of the flow passage and having a plurality of thin conductive elements mounted thereon,
   said conductive elements being cup-shaped and including a serrated peripheral edge,
   electrically insulative support means coupled to said rod to maintain said elongated member centrally of said conduit,
   said thin conductive elements comprise a plurality of discs, and
   the peripheral edge of the discs are serrated to form a series of points from which the corona discharge is emitted.

2. The pollution control apparatus of claim 1 wherein said hollow conduit is a cylindrical in cross section.

3. The pollution control apparatus of claim 1 wherein said inlet includes means to introduce an oxygen containing fluid into the fluid discharge.

4. A pollution control apparatus for reducing the amount of pollutants in a fluid discharge comprising:
   a pollution elimination means having an inlet adapted to be attached downstream of a source emitting a fluid discharge, an outlet to release treated fluid discharge, and flow passage therebetween,
   said pollution elimination means including spaced conductive members positioned downstream of the inlet to allow the fluid discharge to pass adjacent thereto,
   a source of alternating electrical potential coupled to the spaced conductive members to create a corona discharge therebetween for effecting chemical reactions to reduce the amount of pollutants in the fluid discharge passing through and the pollutants eliminating means and prevent adherence of material in the fluid discharge to the pollution elimination means,
   said spaced conductive members comprise a first hollow conduit and a second elongated member positioned in spaced relation therein,
   an electrically and thermally insulative material being mounted in surrounding relationship to the hollow conduit,
   said second elongated member includes a rod extending co-axially with the longitudinal axis of the flow passage and having a plurality of thin conductive elements mounted thereon,
   electrically insulative support means coupled to said rod to maintain said elongated member centrally of said conduit,
   said thin conductive elements comprise a plurality of discs, and
   the peripheral edge of the discs are serrated to form a series of points from which the corona discharge is emitted.

5. A pollution control apparatus for reducing the amount of pollutants in a fluid discharge comprising:
   a pollution elimination means having an inlet adapted to be attached downstream of a source emitting a fluid discharge, an outlet to release treated fluid discharge and a flow passage therebetween,
   said pollution elimination means including a hollow conductive flow conduit attached in fluid communication with said inlet and forming at least part of said flow passage,
   said pollution elimination means further including an elongated corona-emitting member positioned within said hollow conduit in spaced relation thereto,
   said elongated member includes a rod extending coaxially of the longitudinal axis of the flow passage and having a plurality of thin conductive elements mounted thereon,
   the elements having a cup-shape and include a serrated peripheral edge,
   said plurality of cup-shaped elements are mounted in pairs in opposite disposition having the concave sides thereof confronting each other, and
   the serrated edge of one of said pairs overlaps the opposite edge of the opposite element in complementary relationship.

6. A pollution control apparatus for reducing the amount of pollutants in a fluid discharge comprising
   a pollution elimination means having an inlet adapted to be attached downstream of a source emitting a fluid discharge, an outlet to release treated fluid discharge, and flow passage therebetween,
   said pollution elimination means including spaced conductive members positioned downstream of the inlet to allow the fluid discharge to pass adjacent thereto,
   a source of alternating electrical potential coupled to the spaced conductive members to create a corona discharge therebetween for effecting chemical reactions to reduce the amount of pollutants in the fluid discharge passing through and the pollutants eliminating means and prevent adherence of material in the fluid discharge to the pollution elimination means,
   said spaced conductive members comprising a first hollow conduit and a second elongated member positioned in spaced relation therein,
   said second elongated member including a rod extending co-axially with the longitudinal axis of the flow passage and having a plurality of thin conductive elements mounted thereon, said elements having a cup-shape and including a serrated peripheral edge, said plurality of cup-shaped elements being mounted in pairs in opposite disposition having the concave sides thereof confronting each other,
said thin conductive elements comprise a plurality of discs, and
the peripheral edge of the discs are serrated to form a series of points from which the corona discharge is form a series of points from which the corona discharge is emitted.

7. The pollution control apparatus of claim 6 wherein the serrated edge of one of said pairs overlaps the opposite edge of the opposite element.

* * * * *